United States Patent Office 3,203,912
Patented Aug. 31, 1965

3,203,912
PROCESS FOR WATERPROOFING OF CELLULOSIC MATERIALS
Jacob G. Mark, Chestnut Hill, Mass., and Rudolf Gabler, Zollikerberg, Switzerland, assignors to W. R. Grace & Co., Cambridge, Mass., a corporation of Connecticut
No Drawing. Filed Sept. 23, 1960, Ser. No. 57,889
Claims priority, application Switzerland, Sept. 28, 1959, 78,743
8 Claims. (Cl. 260—9)

This invention relates to an improved process of waterproofing cellulosic material.

Specifically, this invention relates to a process wherein cellulosic material, such as cotton, paper, wood and similar polycarbohydrates, may be treated with a polyepoxidized polyaryl compound in order to improve the water repellency of such material. The polyepoxidized polyaryl material used in this treatment has the formula:

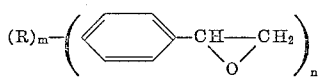

wherein R is a radical selected from the group consisting of O, C, CH, $CH_2$, $C(CH_3)_2$, S, SO and $SO_2$, $m$ is either zero or one, $n$ represents either two, three, or four and $n$, when $m$ is zero, is two and when $m$ is one, is either two, three or four depending on the effective valency of R.

Cellulosic polymers ordinarily absorb water and swell. It is commonly felt that this characteristic is related, in some degree, to the amount of hydroxyl groups possessed by these polymers. From observations, it has been found that swelling of a particularly large degree is not only encountered with natural cellulose but also with cotton, hemp, linen, bast fibers, wood and cork, all of which are related natural materials. Many products which are manufactured from these materials, such as paper, rayon, and cellophane, also swell in water. It has been found that the absorption of water and swelling, which is encountered with the natural or synthetic cellulose polymer, is often accompanied by many other undesirable characteristics such as the reduction of tensile strength, dimensional stability and thermal and electrical insulating properties.

There are many processes which may be used to improve the water repellency of cellulosic material, but to date each has had inherent difficulties.

(a) One approach is to coat or impregnate the cellulosic material with a natural or synthetic polymer which has the characteristic that it will not swell while in contact with water. In general polymers such as rubber, neoprene, polyvinyl chloride, polyvinyl acetate, and other similar materials have been used for this purpose. The disadvantage encountered with the use of such materials, however, is that they reduce the air permeability and alter the surface characteristics and hand of the treated cellulosic material. This is particularly undesirable where the treated material is used for clothing.

(b) Another approach is to impregnate the cellulosic material with chemicals which render that material somewhat water repellent but do not reduce the porosity of the material treated. The chemicals used for this purpose include oils, waxes, salts, oxides, silicones, proteins, urea-formaldehyde and melamine-formaldehyde resins. It has been found, however, that since such materials do not actually react with the cellulose, the effect of the treatment is not permanent and the water repellency is destroyed by laundering or dry cleaning.

(c) A more recent approach to the problem is to esterify or etherify the hydroxyl groups on the cellulosic molecule with water repellent reagents. At first, it was believed that a high degree of water repellency could be achieved with the use of polyepoxidized materials such as the aliphatic polyglycidyl ethers (see U.S. 2,730,427 and U.S. 2,752,269). It was later found, however, that the degree of water repellency imparted to the cellulosic molecule was not as high as was expected, that many of the aliphatic polyepoxidized materials do not impart this property to cellulosic materials at all, and that in the case of the materials in this class that do work, the reaction conditions, especially the nature of the required catalyst and the degree of heat necessary to effect a reaction, damage the cellulose. As a result, more recently the tendency has been to use other water repellent chemicals or polymers in conjunction with the aliphatic polyepoxidized material in order to increase the water repellency and to reduce the severity of the required reaction condition (see for example U.S. Patents 2,774,691 and 2,794,754). None of these combinations, however, have proved to be as effective or as durable as the water repellency imparted to cellulosic material by the present treatment.

It is an object of this invention to provide a process by means of which cellulosic material may be treated with a polyepoxidized polyaryl compound in order to impart a permanent degree of water repellency to such cellulosic material without changing the cellulose.

It is a further object of this invention to provide cellulose with a degree of water repellency heretofore unattainable with the polyepoxides that have been used for this purpose.

It has now been found that polyepoxides having the formula set forth below react readily with cellulose to impart thereto a high degree of permanent water repellency. The formula representing this class of materials is:

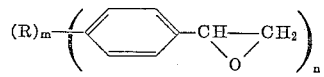

wherein R is a radical selected from the group consisting of O, C, CH, $CH_2$, $C(CH_3)_2$, S, SO and $SO_2$ $m$ is zero or one and $n$, when $m$ is zero, is two and when $m$ is one, is either two, three or four depending on the effective valency of R. The materials included within this formula are unique for this type of treatment. They distinguish themselves structurally from the expoxides in use heretofore in that the oxirane rings of the molecule are directly bound to carbon atoms of the benzene ring. Another distinguishing feature is the fact that at least two (epoxyethyl) phenyl groups are linked together in a para position, either directly or by means of an intermediate atom or group of atoms exhibiting a two, three or four valence. These particular expoxides react readily and under very mild conditions with materials including cellulose having hydroxyl groups. In fact many of the molecules in this group react with cellulose in the absence of any catalyst and at temperatures as low as 60 to 80° C. In contrast, the aliphatic polyepoxides in general use will in the absence of a catalyst only react completely with hydroxyl groups of cellulose at temperatures in excess of 200° C. and in the presence of strong acidic catalysts in the range of 140° C. Such reaction conditions, in many cases, degrade or change the chemical nature of the cellulose being treated esepcially where the surface area is relatively large as in the case of textiles.

The preparation of the polyepoxidized polyaryl material, exemplified by the foregoing formula, may generally be accomplished by either of two procedures, i.e. (1) by the oxidation of the divinyl derivative of a compound corresponding in structure to the particular product desired or, (2) by the dehydrohalogenation of the dichlorohydrin derivative of a compound which again corresponds in structure to the product desired.

The preparation of such epoxy compounds may be accomplished according to numerous analogous examples, generally in two ways:

(1) By oxidation of the corresponding divinyl compound according to the formula:

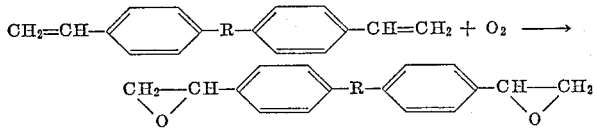

or (2) From the dichlorohydrin by splitting off hydrochloric acid with alkali according to the following reaction:

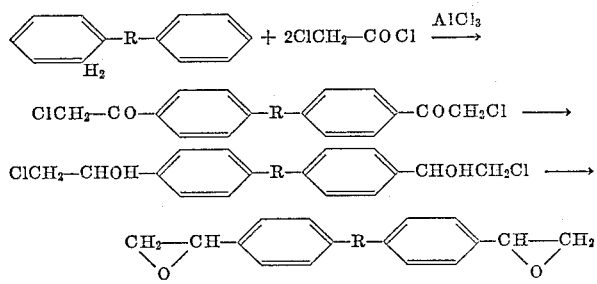

The simplest representative of this group of compounds, which has been found useful in treating cellulosic materials, is 4,4'-(epoxyethyl)-diphenyl. In actual tests, this particular compound has exhibited a larger degree of reactivity towards hydroxyl groups than polyglycidyl ethers of a similar nature. Other compounds which fall into this grouping and which exhibit this high degree of reactivity include 4,4'-bis(epoxyethyl) diphenylether, 4,4'-bis-(epoxyethyl) diphenylmethane, 4,4'-bis-(epoxyethyl) diphenylsulphide, 4,4'-bis-(epoxyethyl) - diphenyl - (2,2)-propane, and 4,4',4''-tris-(epoxyethyl)-triphenylmethane.

The above named compounds are very reactive with hydroxyl groups. In the case of primary hydroxyl groups, the reaction proceeds rapidly at mild temperatures in the absence of any catalyst. These polyepoxidized polyaryl compounds are, however, somewhat less reactive towards secondary alcohols and it is advisable to use a mild catalyst in order to achieve the reaction. Materials which are useful as catalysts include formic, acetic, propionic, oxalic, phosphoric, boric, sulfuric and hydrochloric acids. Salts of the foregoing acids are also useful as catalysts as are the salts of the Lewis acids such as zinc chloride, tin tetrachloride, boron fluoride, and zinc boron fluoride. A catalytic effect can also be achieved with amines, such as triisobutyl amine, although alkalis, in general, do not influence the reaction of these polyexpoxidized polyaryl compounds with hydroxyl groups.

As stated previously, the present invention will impart water repellency to all types of natural and modified cellulosic material. The extent of water repellency imparted to these materials will, in a large extent, depend upon the number of free hydroxyl groups that the cellulose in these materials contains in its molecular chain. Thus water repellency can be imparted by the present treatment not only to fabrics made from cotton, flax and other naturally occurring cellulosic fibers but also to fabrics made from modified cellulose such as many of the rayons and to various papers and woods.

These polyaryl polyepoxide chemicals are preferably applied to the cellulosic materials by means of a solvent solution. The use of a 1 to 10 percent solution by weight is generally satisfactory. Solvents which have been found suitable for this purpose include acetone, methyl, ethyl ketone, chloroform, methylene chloride, benzene, and toluene. The catalyst may be added to the solvent and is generally added when used in a quantity sufficient to result in a 0.1 to 1.0 percent concentration by weight. In the absence of free hydroxyl groups the solution containing the epoxide or catalyst is relatively stable as shown by the fact that a solution containing 1 percent by weight of bis-(epoxyethyl) diphenylether was stable for weeks even though it contained 0.7 percent by weight of formic acid. In this connection, stability was indicated by the fact that the epoxy equivalent of the compound did not change substantially. Although the polyaryl polyepoxide is preferably applied to the cellulosic material by means of a solvent solution, it may also be applied in the form of a water-dispersion or emulsion. Bis-(epoxyethyl)-diphenyl methane is especially suitable for use in making dispersion or emulsion in water. In making such an emulsion or dispersion, a neutral or weakly basic surface active agent may be used to either emulsify or stabilize the reagent mixture.

The polyaryl polyepoxidized reagent, whether it be in the form of a solution, dispersion or emulsion, may be applied to the cellulosic material by soaking, padding or spraying. After this treatment, the excess polyaryl polyepoxidized reagent is removed from the treated material, usually by squeezing, and the treated material is subsequently cured in an oven. The time and temperature required to complete the reaction is dependent upon the particular polyaryl polyepoxide utilized in the process, the amount and kind of catalyst used, and upon the nature of the particular cellulosic material treated. For example, it has been found that regenerated cellulose will react with the polyaryl polyepoxide within a few minutes of 100° C., but hard plywood requires several hours at the same temperature to react. While any source of heat may be used, it has been found practical in most cases where the treated material is flexible to run the material over heated rolls. A few minutes of contact with the rolls, when they are at a temperature of 180°–200° C., has been found to be generally sufficient to substantially fix the polyaryl polyepoxide to the treated material. Completion of the reaction can be measured in any event by the amount of the material that remains soluble after the reaction. For example, in actual tests it was found that fabrics treated by this process did not lose weight even though it was subjected to repeated washings at 80° C. This indirectly demonstrates the durability and permanent nature of the water repellency imparted to the cellulosic material by this process.

In actual practice, the cellulosic material treated by this process may contain as much as 10 percent or more by weight measured as weight increase of the polyaryl polyepoxide. A perceivable water repellency, however, has been obtained although the treated material has gained a much lower quantity of resin, i.e. 0.2 to 0.5 percent by weight on the weight of the material after treatment. In the case of fabrics made of natural or regenerated cellulose, full water repellency results from as little as a 1 to 3 percent weight gain.

*Example I*

A piece of cotton cretonne ten centimeter square was soaked in 100 cc. of an acetone solution containing 10 gms. of 4,4'-bis-(epoxyethyl)-diphenylether and 1 gm. of concentrated formic acid. After soaking, the excess solution was separated by centrifuging. The treated sample was then dried in air for 1 to 2 hours, placed in an oven and heated for 1 hour at 100° C. Upon analysis, it was found that the sample had picked up about 1.3% by weight of the polyepoxide applied on the total weight of the fabric. The fabric was then stretched in a frame and held under a stream of water at an angle of 45°. It was found that the treated fabric was completely water repellent and that droplets of water had formed upon its surface. No notable decrease in finish or water repellency could be found even after the treated fabric was washed 10 times under standard laundering conditions.

*Example II*

A quantity of absorbent cotton was soaked in a solution containing 1% by weight of 4,4'-bis-(epoxyethyl)-diphenylmethane dissolved in methylene chloride. The excess solution was squeezed off and the treated cotton was then air dried, placed in an oven and heated for 1 hour at 110° C. Upon analysis, it was found that the sample had gained about 0.85% by weight of its original weight due to the treatment. No weight loss could be detected after repeated washings with water. It is also of interest to note that a treated piece of cotton floated for weeks in water but an untreated piece of the same cotton sank to the bottom of the beaker within 5 minutes.

*Example III*

A piece of rayon twill was soaked, at room temperature, in a 5% water emulsion of 4,4'-bis(epoxyethyl)-diphenylmethane which contained 0.2% of the ammonium salt of a sulfonated castor oil as a wetting agent and 0.3% of acetic acid as a catalyst. After soaking, the excess emulsion was removed by centrifuging. The treated sample was then dried in air, placed in an oven and heated for 2 hours at a temperature between 90° C. to 100° C. Upon analysis, it was found that the sample picked up about 1.1% by weight of the polyepoxide on the original weight of the fabric. The treated sample was water repellent, resistant to common laundering, and exhibited an increase in crease resistance over an untreated sample of the same material.

*Example IV*

A piece of beech plywood was sprayed on one side with a 1% water emulsion of 4,4'-bis-(epoxyethyl)-diphenyl-ether containing 0.2% of the ammonium salt of a sulfonated castor oil as an emulsifier and 0.1% formic acid as a catalyst. After spraying, the treated plywood was air-dried, placed in an oven and hardened by heating it to a temperature between 85°–95° C. for a period of three hours. It was found that the treated side of the plywood was so water repellent that droplets of water would completely evaporate from the treated surface before the wood itself was even wet.

*Example V*

A piece of filter paper having a diameter of about 7 cm. was soaked in 100 cc. of an acetone solution containing 1 gm. of 4,4'-bis-(epoxyethyl)-diphenylether and 0.1 gm. of 85% formic acid as a catalyst. The filter paper before treatment had a medium porosity, a filter speed of 50 to 70 seconds, and a weight of about 86 gms. per square meter. After the treated paper was completely saturated, it was taken from the solution and the excess solution was removed from it. The treated paper was then air-dried at room temperature, placed in an oven and cured for 1 hour at a temperature of about 100° C. Upon analysis, it was found that the paper had picked up about 2.3% by weight of resin on its original weight. It was found that none of the resin picked up by the paper could be removed even after repeated washings. The paper after treatment was no longer water permeable and exhibited an increase in both stiffness and tensile strength.

*Example VI*

A piece of cotton was soaked in an acetone solution containing 1 gm. of 4,4'-bis-(epoxyethyl)-diphenyl and 0.1 ml. of 85% formic acid. After soaking, the excess solution was removed from the sample. The treated cotton was then air-dried, placed in an oven and heated for 1 hour at 100° C. It was found that the treated sample was water repellent and retained this characteristic even after washing in water for 10 minutes at 100° C.

We claim:
1. The process of rendering cellulose water repellent which comprises contacting the cellulose with a polyaryl polyepoxide selected from the group consisting of 4,4'-(epoxyethyl)-diphenyl; 4,4'-bis-(epoxyethyl)-diphenylether; 4,4'-bis-(epoxyethyl)-diphenylmethane; 4,4'-bis-(epoxyethyl) diphenylsulfide; 4,4'-bis-(epoxyethyl)-diphenyl-(2,2)-propane; and 4,4',4''-tris-(epoxyethyl)-triphenylmethane; and curing the polyaryl polyepoxide-containing cellulose at a temperature ranging from about 60° C. to about 200° C.
2. The process of claim 1 wherein the polyaryl polyepoxide is 4,4'-bis-(epoxyethyl)-diphenyl.
3. The process of claim 1 wherein the polyaryl polyepoxide is 4,4'-bis-(epoxyethyl)-diphenylether.
4. The process of claim 1 wherein the polyaryl polyepoxide is 4,4'-bis-(epoxyethyl)-diphenylmethane.
5. The product produced by the process of claim 1.
6. The product produced by the process of claim 2.
7. The product produced by the process of claim 3.
8. The product produced by the process of claim 4.

References Cited by the Examiner

UNITED STATES PATENTS

| | | | |
|---|---|---|---|
| 2,252,039 | 8/41 | Schirm | 8—116 |
| 2,730,427 | 1/56 | Suen | 8—116 |
| 2,903,381 | 9/59 | Schroeder | 8—116 |

OTHER REFERENCES

Hopff et al.: Helv. Chem. Acta., vol. 42, pages 2457–67 (1959).

WILLIAM H. SHORT, *Primary Examiner.*

W. B. KNIGHT, A. H. WINKELSTEIN, *Examiners.*